J. R. SNYDER.
TRIPLE VALVE.
APPLICATION FILED AUG. 27, 1912.
1,097,060.
Patented May 19, 1914.
3 SHEETS—SHEET 1.
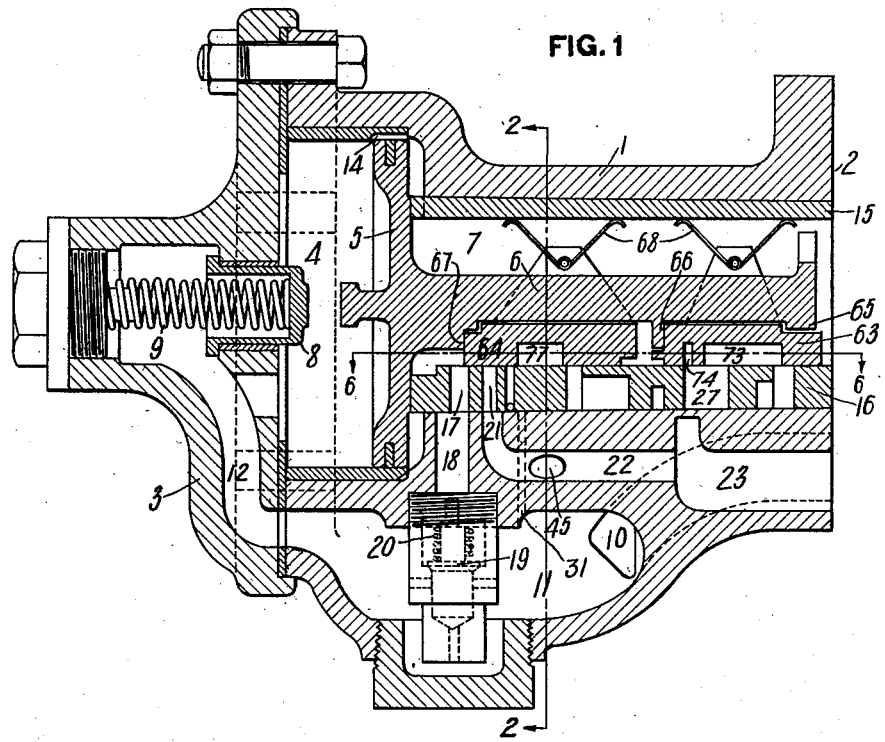
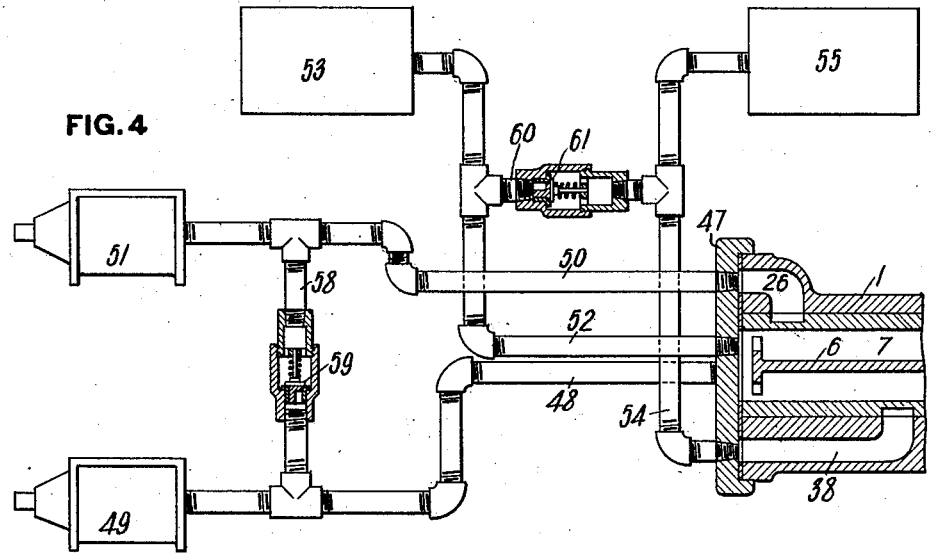
WITNESSES
INVENTOR
Jacob Rush Snyder.
By Fredk W. Winter
Attorney

J. R. SNYDER.
TRIPLE VALVE.
APPLICATION FILED AUG. 27, 1912.

1,097,060.

Patented May 19, 1914.
3 SHEETS—SHEET 3.

WITNESSES
W. T. Holman
W. P. Larkin

INVENTOR
Jacob Rush Snyder,
By Fredk W. Winter
Attorney

UNITED STATES PATENT OFFICE.

JACOB RUSH SNYDER, OF PITTSBURGH, PENNSYLVANIA, ASSIGNOR TO PERCY E. DONNER, OF PITTSBURGH, PENNSYLVANIA.

TRIPLE VALVE.

1,097,060.  Specification of Letters Patent.  Patented May 19, 1914.

Application filed August 27, 1912.  Serial No. 717,364.

*To all whom it may concern:*

Be it known that I, JACOB RUSH SNYDER, a resident of Pittsburgh, in the county of Allegheny and State of Pennsylvania, have invented a new and useful Improvement in Triple Valves, of which the following is a specification.

This invention relates to triple valves for air brake systems and more particularly for passenger car service.

The object of the invention is to provide a triple valve having all of the usual functions of triple valves and in addition providing for a quick serial action of the brakes throughout the train, for a graduated release of the brakes, for maintaining the pressure in the brake cylinder in service application against leakage, and in its preferred form also providing for the use of a pair of brake cylinders; and which performs these various functions by a much simpler and less complicated construction than prior triple valves capable of effecting the same results and functions.

The invention comprises the construction and arrangement of parts of a triple valve and associated elements hereinafter described and claimed.

Figure 2:
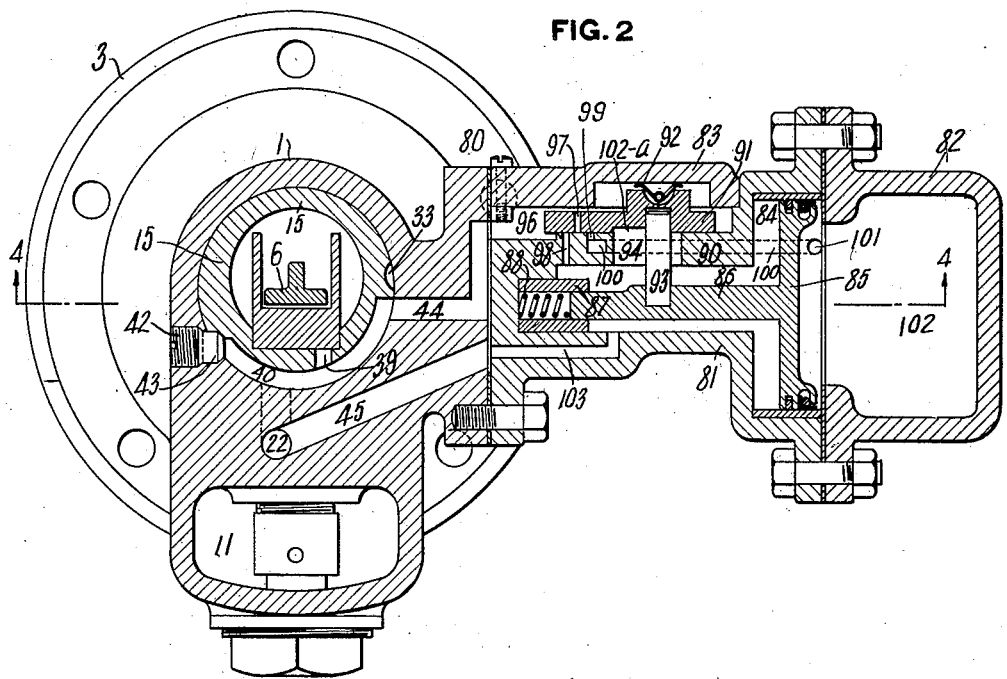
Figure 3:
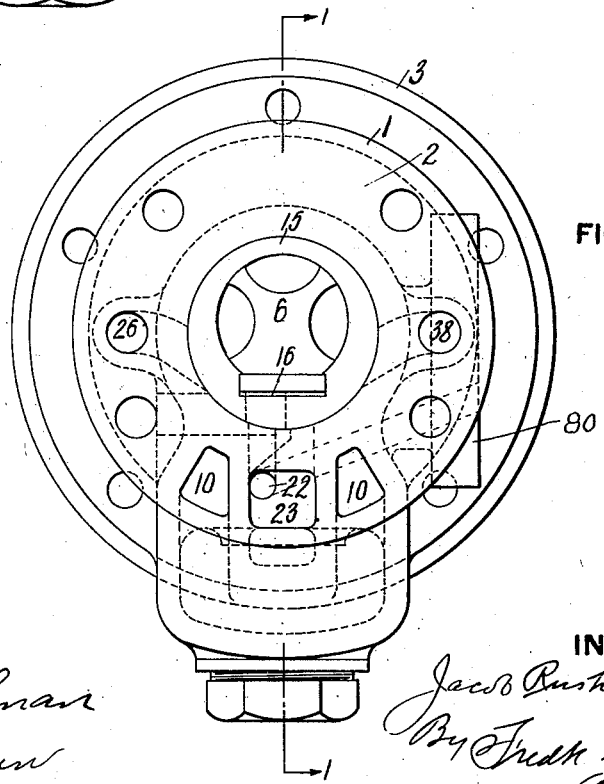
Figure 10:
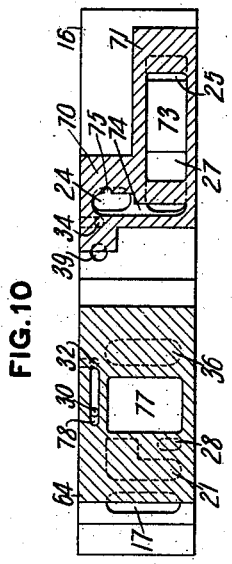
Figure 11:
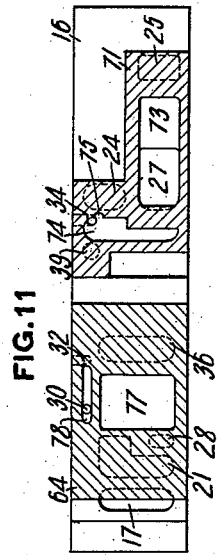
Figure 12:
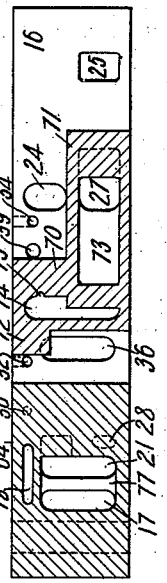
Figure 5:
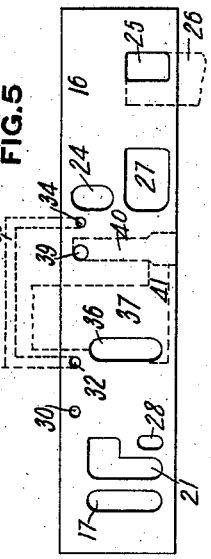
Figure 6:
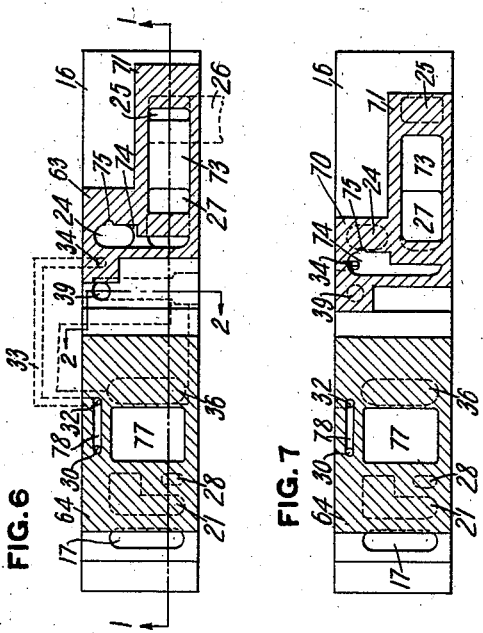

In the accompanying drawing, Figure 1 is a longitudinal section through a triple valve embodying the invention, the casing being sectioned on the line 1—1, Fig. 3, while the valves and valve seat are taken on the section 1—1, Fig. 6; Fig. 2 is a transverse section taken generally on the line 2—2, Fig. 1, with the main valve seat taken on the section line 2—2, Fig. 6; Fig. 3 is an end view of the triple valve, the pressure maintenance valve being omitted; Fig. 4 is a diagrammatic view showing a portion of the triple valve in horizontal section on the line 4—4, Fig. 2 and showing the brake cylinders, supplementary and auxiliary reservoirs and connections therefrom to the triple valve; Fig. 5 is a plan view of the main valve seat; and Figs. 6, 7, 8, 9, 10, 11 and 12 are diagrammatic views showing the valve seat in plan and the slide valves in horizontal section on the line 6—6, Fig. 1, and showing the different positions of the valve, Fig. 6 showing the same in full release position, Fig. 7 in quick service or quick serial application position, Fig. 8 in full service position, Fig. 9 in service lap position, Fig. 10 in graduated release position, Fig. 11 in graduated release lap position and Fig. 12 in emergency position.

The valve in its general form, construction and arrangement follows the standard type of Westinghouse and similar valves. It comprises a casing 1, provided at its inner end with a flat face 2 for the usual connection to the auxiliary reservoir and brake cylinder if desired, and is closed at its opposite end by the head or cap 3. In said casing is the chamber 4 in which works the main piston 5 which is provided with a stem 6 extending into the bore 7 of the casing and actuating the slide valves. In the head or cap 3 is the usual graduating stem or stop 8 held by the graduating spring 9 and against which the main piston abuts in service and emergency applications as is usual. The train pipe connection is through two passages 10, one on each side of the longitudinal center of the valve, and which meet in the common passage or chamber 11 from which a passage 12 leads through the head or cap 3 and communicates with the piston chamber 4. In the bushing of piston chamber 4 is the usual charging groove 14 which is open when the valve is in full release position and through which train pipe air passes to the auxiliary reservoir which is connected to the end of bore 7. In the bore 7 is a suitable bushing 15, whose lowermost portion 16 forms a valve seat which is provided with the ports and passages shown in Fig. 5, to wit:—A port 17 communicating with passage 18 in the casing and which leads to the train pipe passage 11, a check valve 19 being placed in said connection and being seated by spring 20 toward the train pipe; a port 21 communicating with a passage 22 extending downwardly and then longitudinally in the casting and communicating with the larger passage 23 arranged centrally and communicating with one of the brake cylinders and which will hereinafter be designated as cylinder No. 1; a port 24 near the opposite end of the valve seat and communicating directly with brake cylinder passage 23; port 25 still nearer the opposite end of the valve seat and communicating with passage 26 to which is connected the other brake cylinder hereinafter referred to as cylinder No. 2; a port 27 laterally in line with brake cylinder port 24 and longitudinally in line with port 25 and communicating with the atmosphere and forming the exhaust for the valve; a relatively small port 28 in proximity to brake cylinder port 21 and communicating with the usual reducing or blow off valve; a small port 30 communicating with vertical passage 31 leading to the train pipe passage 11; a small port 32 in proximity to port 31 and communicating through passage 33 formed in the outer face of the bushing 15 and leading to a small port 34 in proximity to brake cylinder port 24; a large port 36 communicating with the groove 37 cut in the outer face of the bushing 15 and extending part way around the same and leading to a longitudinal passage 38 in the casing and communicating with the supplementary reservoir; a smaller port 39 communicating with groove 40 cut in the outer face of bushing 15 and communicating at 41 with the supplementary reservoir passage 37, the ports 36 and 39 therefore being supplementary reservoir ports. The port 39 can be blanked off or rendered inoperative (which is particularly desirable when the valve is designed to have a graduated release position to prevent the supplementary reservoir air from reinforcing the auxiliary reservoir pressure) by means of a plug 42 threaded into the casing and having an extension 43 adapted to close one end of groove 40. When it is desired not to blank off port 39, a plug 42 without the extension 43 is screwed into the opening. From the supplementary reservoir passage 37 a passage 44 extends laterally through the casing 1 to the pressure maintenance valve hereinafter described, and from the brake cylinder passage 22 a lateral passage 45 also extends to said pressure maintenance valve.

Fig. 4 shows diagrammatically the connection of this triple valve with the brake cylinders and the auxiliary and supplementary reservoirs. As here indicated, the end 2 of the valve casing is closed by means of cap 47 provided with suitable openings for receiving the several pipes leading to the coöperating parts, to wit: a pipe 48 communicating with brake cylinder passage 23 and leading to brake cylinder No. 1, marked 49; a pipe 50 communicating with passage 26 and leading to brake cylinder No. 2, marked 51; a pipe 52 communicating with the end of bore 7 and leading to the auxiliary reservoir 53; a pipe 54 communicating with passage 38 and leading to the supplementary reservoir 55, and a pipe (not shown) connecting the train pipe passages 10 with the usual train pipe. Between the brake cylinders 49 and 51 is a connection 58 in which is a check valve 59, spring seated toward brake cylinder No. 1, and between the auxiliary and supplementary reservoirs is a connection 60 in which is a check valve 61 spring seated toward the auxiliary reservoir.

Coöperating with the valve seat 16 are a pair of slide valves 63 and 64. The slide valve 63 is held between an end projection 65 and an intermediate projection 66 on the main valve stem 6 and substantially fills the space between said projections so that said valve 63 at all times moves with the piston 5. The slide valve 64 is held between the intermediate projection 66 and the shoulder 67 on the main piston stem 6 but does not fill the space between said projection and shoulder so that there is a certain amount of lost motion which permits the main piston to move at times without moving the valve 64. These slide valves are held to the seat by the usual springs 68.

The slide valve 63 is of the form shown in Figs. 6 to 12 being of modified L-shape having the main transverse portion 70 with a large longitudinal portion 71 at one side and a smaller longitudinal portion 72 on the opposite side. It is provided in its lower face with a pair of cavities, to wit: a large longitudinal cavity 73 in the main longitudinal portion 71 and a transverse cavity 74 in the transverse portion 70, which cavity 74 is of irregular form, as shown, and provided near one end with a small longitudinal extension 75. The slide valve 64 is of rectangular form and is provided in its lower face with a large cavity 77 of rectangular form and a smaller longitudinal cavity 78 near one side.

The pressure maintenance valve is secured to one side of the main casing 1, the latter being provided with a flange 80 to receive said maintenance valve which comprises a main casing portion 81 secured to the flange 80 and having at its outer end a cap 82 and on its top a removable cover portion 83. In the casing 81 is a suitable chamber 84 in which works a piston 85 provided with a stem 86 whose inner end enters a guide 87 in which is a light helical spring 88. The upper portion 90 of casing 81 forms a seat for the slide valve 91 which is held against said seat by spring 92 and which is operated by a pin 93 projecting from piston stem 86 through an opening 94 in valve seat 90. The slide valve 91 operates in chamber 96 with which communicates the passage 44 coming from supplementary reservoir passage 37, and said valve is provided with through port 97, while the valve seat is provided with port 98 communicating with the chamber 84 and a second port 99 communicating with a longitudinal passage 100 cored out in the casing 81 and opening at 101 on the outer side of piston 85 for the purpose of supplying air at the proper time to chamber 102 in the cap 82 on the outer face of piston 85. Brake cylinder passage 45 connects with a passage 103 which opens into the chamber 84.

The piston 85 and valve 91 normally stand in neutral position, shown in Fig. 2, in which position no pressure is in either the chamber 84 or chamber 102. In service applications, however, air flows from brake cylinder passage 22 through passages 45 and 103 into chamber 84, thereby forcing the piston 85 outward or to the right, viewing Fig. 2, and bringing the port 97 in slide valve 91 into register with port 99 which permits air to flow from the supplementary reservoir through passages 37 and 44, chamber 96, ports 97 and 99, and passage 100 to the chamber 102 on the outer face of piston 85. As soon as this pressure equalizes with the brake cylinder pressure on the inner face of piston 85, the latter moves back to neutral position, until stopped by spring 88, thereby blanking the port 99 and trapping in the chamber 102 pressure substantially equal to that in the brake cylinder. While the main valve is in service lap position as long as the pressure in the brake cylinder remains constant or substantially so, no movement of the piston 85 occurs. Should, however, the brake cylinder pressure leak off immaterially, it correspondingly reduces pressure in the chamber 84 whereupon the superior pressure in chamber 102 forces the piston 85 inwardly, compressing spring 88 and bringing port 97 of slide valve 91 into register with the port 98, which permits supplementary reservoir pressure to flow through said ports 97 and 98 and through the valve chamber 84 to passage 103 and thence through passages 45 and 22 to the brake cylinder. This builds up the brake cylinder pressure until it again equalizes with the pressure in chamber 102 when the spring 88 pushes the piston 85 outwardly to blank the port 98. If the pressure again falls in the brake cylinder, the foregoing operation is repeated so that said valve serves to maintain a substantially uniform pressure in the brake cylinder when the main valve is in service lap position.

The connection 45 leads to brake cylinder 49, but the pressure in brake cylinder 51 is also maintained against leakage as check valve 59 permits the flow of pressure fluid from cylinder 49 to cylinder 51. The maintenance valve therefore, will maintain the pressure in either one or both of the brake cylinders depending upon whether one or both is leaking.

The supplementary reservoir is charged from the auxiliary reservoir through the connection 60 past the check valve 61, which check valve, however, prevents the backward flow of air, so that the air in the supplementary reservoir is trapped whenever air is withdrawn from the auxiliary reservoir.

The valve described has seven positions as follows:

1. *Full release and recharging position.* (Shown in Figs. 1 and 6.)—In this position the main piston is at its extreme inward position so as to uncover feed groove 14 and permit air to flow from the train pipe through passages 10, 11 and 12, chamber 4, thence through groove 14, through bore 7 of the valve and through the pipe 52 to the auxiliary reservoir and through the connection 60 to the supplementary reservoir, until the pressures in the auxiliary and supplementary reservoirs equalize with the train pipe pressure. In this position, supplementary reservoir port 39 in the valve seat 16 is uncovered so that the supplementary reservoir is charged through this port providing the passage 40 is not blanked off by plug 43. In this position also the cavity 74 of slide valve 63 connects brake cylinder port 24 with exhaust port 27 while cavity 73 of the same slide valve connects brake cylinder port 25 with exhaust port 27, so that both brake cylinders are exhausted to the atmosphere. Train pipe port 17 is also uncovered so that train pipe air can flow directly to the bore 7 of the valve and thence to the supplementary and auxiliary reservoirs until the pressure in the latter, plus the tension of spring 20 equals train pipe pressure when valve 19 will close and thereafter the charging of the reservoirs continues more slowly through feed groove 14. This provides for a quick charging of the auxiliary and supplementary reservoirs. All other ports are blanked. It is true that cavity 78 of valve 64 connects train pipe port 30 with port 32 but the connected port 34 is covered by valve 63 so that no effect is produced. Inasmuch as brake cylinder port 24 is connected to the exhaust port 27 this also exhausts chamber 84 of the pressure maintenance valve, and should there be any pressure in chamber 102, it drives the piston 85 fully over to the left, compressing spring 88 and moving the slide valve 91 until port 97 is beyond port 98, and causing cavity 102ª to connect port 99 with the opening 94, thereby exhausting the pressure from chamber 102, whereupon spring 88 moves the piston 85 and valve 91 to neutral position. Consequently, in full release position, there is no pressure on either side of piston 85 of the pressure maintenance valve and the connection between the supplementary reservoir and brake cylinder is blanked.

Figure 7:
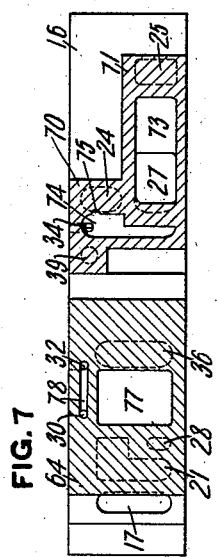
Figure 8:
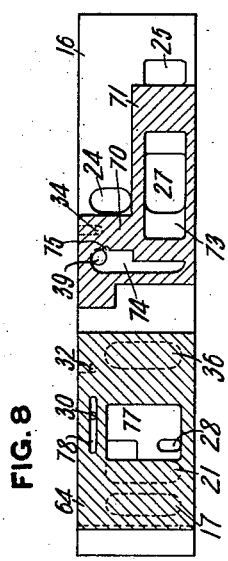
Figure 9:
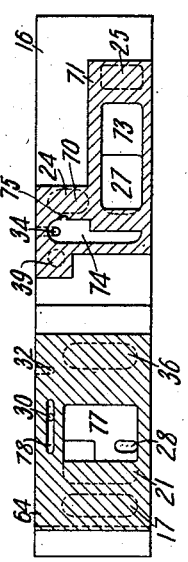

2. *Quick service or serial venting position.* (Shown in Fig. 7.)—This position is assumed upon the first movement of the main piston upon slight reduction of train pipe 63 from the position shown in Fig. 6 to that shown in Fig. 7, but without moving the slide valve 64 due to the lost motion connection between the same and the main piston stem. In this position the feed groove 14, exhaust port 27 and supplementary reservoir port 39 are blanked, thereby trapping the air in the supplementary reservoir. The valve 63 is moved over so that cavity 74 laps over port 34, while longitudinal extension 75 of cavity 74 extends over brake cylinder port 24. This gives a direct communication between the train pipe and the brake cylinder through port 30, cavity 78 in slide valve 64, port 32, passage 33, port 34, and cavity 74 with its extension 75. The result is that the train pipe is momentarily vented to the brake cylinder which is at atmospheric pressure, thereby producing a drop in pressure in the train pipe at the car and securing a quicker serial application of the brakes throughout the length of the train. The effect is the same as though at each car the train pipe were momentarily vented to the atmosphere to secure quicker reduction of train pipe pressure toward the rear of the train than would be possible if all the air had to flow forwardly and out at the engineer's brake valve. Instead, however, of venting the train pipe at each car to the atmosphere it is vented into the empty brake cylinder thereby producing a light setting of the brakes. The valve remains for a brief time in this position, due to the fact that the first movement of the piston 5 moves only the slide valve 63, but as soon as the slack between the piston stem 6 and the slide valve 64 is taken up the greater friction encounter momentarily checks the piston, thereby providing an appreciable time for venting the train pipe into the empty brake cylinder. The reduction of train pipe pressure caused thereby produces a sufficient unbalancing of pressures on the opposite sides of the main piston to overcome the friction of both slide valves, and the valve almost immediately moves to the next position now to be described.

3. *Full service position.* (Shown in Fig. 8.)—In this position the slide valve 63 has moved over sufficiently to uncover brake cylinder ports 24 and 25, while blanking exhaust port 27, supplementary reservoir port 39 and vent port 34. This allows auxiliary reservoir air to flow to both brake cylinders. The valve 64 has blanked all ports except that it connects brake cylinder port 21 with reducing valve port 28 thereby permitting all pressure in brake cylinder 49 in excess of that to which the reducing valve is set to escape to the atmosphere. Air also flows from the brake cylinder connection 22 through passages 45 and 103 to chamber 84 in the pressure maintenance valve, thereby moving piston 85 outwardly and bringing port 97 of slide valve 91 into register with port 99 whereby supplementary reservoir pressure will flow through passages 37 and 44, chamber 96, ports 97 and 99 and passage 100 to chamber 102 on the outer face of piston 85, until the pressure in said chamber substantially balances the pressure in chamber 84 (which is equal to brake cylinder pressure), whereupon the piston 85 moves inwardly until its stem contacts with spring 88, thereby blanking port 99 but without bringing port 97 into register with port 98.

4. *Service lap position.* (Shown in Fig. 9.)—This position is assumed by the valve on the slight recoil such as occurs immediately after a service application due to the momentary excess of pressure on the train pipe side of the main piston. The slide valve 64 has remained stationary due to the lost motion connection between itself and the main piston stem, but the slide valve 63 has moved over sufficiently to blank the brake cylinder ports 24 and 25, thereby cutting off further flow of air from the auxiliary reservoir to the brake cylinder but maintaining that which is already there. Should the pressure in either brake cylinder leak off appreciably it reduces the pressure in chamber 84 of the maintenance valve, whereby the trapped pressure in chamber 102 moves the piston 85 inwardly, compressing spring 88, until port 97 registers with port 98, thereby permitting supplementary reservoir air to flow through the maintenance valve to the brake cylinders and restore the pressure therein. As soon as the brake cylinder pressure is built up to the desired degree, it reacts in chamber 84, permitting spring 88 to expand and move the piston 85 outwardly to neutral position and blank the communication between the supplementary reservoir and brake cylinders. The maintenance valve will act in this manner as frequently as the brake cylinder pressure leaks off appreciably, and results in maintaining the pressure in the brake cylinders practically constant from the supplementary reservoir in which the pressure is still higher than in the auxiliary reservoir which has been partly equalized into the brake cylinders. As soon as the main valve goes to full release position, the pressure in chamber 84 of the maintenance valve is entirely withdrawn, so that the piston 85 will be moved over completely to the left, viewing Fig. 2, so that cavity 102$^a$ in slide valve 91 connects port 99 with the opening 94, thereby exhausting all pressure from chamber 102 and bringing the maintenance valve back to normal condition, that is with the piston 85 and valve 91 in neutral position and no pressure on either face of said piston.

5. *Graduated release position.* (Shown in Fig. 10.)—This position is assumed by the valve upon a slight increase of train pipe pressure after a service application and moves the valves 63 and 64 partly toward release position to slowly release the brakes. In this position, the valve 64 blanks the connection between the brake cylinder port 21 and reducing valve port 28, the supplementary reservoir port 39 is partly uncovered by slide valve 63 so that the supplementary reservoir replenishes the auxiliary reservoir to the point of equalization with the increased train pipe pressure. The cavity 74 of slide valve 63 partly overlaps brake cylinder port 24 and exhaust port 27 while cavity 73 partly overlaps brake cylinder port 25 and exhaust port 27, thereby permitting both brake cylinders to slowly vent to the atmosphere. The valve remains in this position only momentarily as the slight recoil which always occurs after movement of the valve, moves the same back to blank the connection between the brake cylinder ports 24 and 25 and exhaust port 27, but by again slightly increasing the train pipe pressure the valve 63 can be repeatedly removed to the position shown in Fig. 10 and the brakes graduated off. This sudden reduction of brake cylinder pressure reacts in chamber 84 of the maintenance valve, whereupon the superior pressure in chamber 102 moves the piston 85 and valve 91 inwardly until cavity 102ª connects port 99 with opening 94 and permits pressure in chamber 102 to exhaust until it equalizes with brake cylinder pressure, when spring 88 moves the piston 85 and valve 91 back to neutral position, whereupon the maintenance valve will continue to maintain the pressure in the brake cylinder at the lower pressure.

6. *Graduated release lap position.* (Shown in Fig. 11.)—This position is due to the slight recoil above referred to or by the slight increase of auxiliary reservoir pressure over train pipe pressure due to the high pressure from the supplementary reservoir replenishing the auxiliary reservoir by way of port 39 when the valve is in graduated release position. The slide valve 64 has remained stationary, but the slide valve 63 has moved sufficiently to blank the connections between the brake cylinder ports 24 and 25 and the exhaust port 27 and also blank the supplementary reservoir port 39. If the valve is to remain in this position to hold the reduced brake cylinder pressure, the pressure maintenance valve will operate exactly as in service lap position to maintain this reduced brake cylinder pressure against leakage.

7. *Emergency position.* (Shown in Fig. 12.)—This position is assumed upon a large reduction in train pipe pressure which causes the main piston 5 to compress the graduating spring 9 and move fully over to the left, viewing Fig. 1. In this position the exhaust port 27 and train pipe vent port 30 are blanked as is also the port 28 leading to the reducing valve. Both brake cylinder ports 24 and 25 are fully uncovered as are also both supplementary reservoir ports 36 and 39 and consequently both brake cylinders are supplied with air from the auxiliary and supplementary reservoirs. Cavity 77 of valve 64 also connects train pipe port 17 and brake cylinder port 21, so that train pipe pressure flows past the check valve 19 directly to brake cylinder 49 and through the connection 58 to brake cylinder 51. This flow of train pipe air continues until the brake cylinder pressure plus the tension of spring 20 equals the train pipe pressure, after which the check valve 19 closes and the application is completed by equalization of the auxiliary and supplementary reservoirs with the brake cylinders. The flow of air from the train pipe to the brake cylinders vents the train pipe at the car to secure a quick serial action of the brakes throughout the train. The high brake cylinder pressure in chamber 84 moves the piston 85 outwardly to further charge chamber 102 from the supplementary reservoir. Usually, however, in emergency applications, the train pipe pressure is so low that the main piston remains fully over to the left irrespective of brake cylinder leakage, so that usually the pressure maintenance valve will not be operative but it is in position to act if the condition of the brake cylinder requires.

The emergency position of the valve can be secured either directly from full release position or from any of the other positions of the valve, by merely reducing the train pipe pressure below the point of equalization of auxiliary reservoir pressure with the brake cylinder.

The valve described has all the usual functions of triple valves, including the quick service or serial venting position to secure the rapid serial action of the brakes throughout the train in service as well as in emergency applications, and also the graduated release of the brakes and means for maintaining the pressure in the brake cylinders during service applications, in addition to the usual service and emergency application positions, as well as enabling the brakes to be held in any of the positions by lapping the valve. The valve, therefore, performs all of the functions of the most approved triple valves but by a mechanical construction which is simpler and less complicated than existing valves which perform all of the functions of this valve. Consequently the valve not only is cheaper in first cost, but is more reliable in action, less liable to get out of repair, cheaper in its upkeep, and offers less resistance to movement than similar valves capable of securing the same functional effects.

What I claim is:

1. In a fluid pressure brake, the combination with a train pipe, auxiliary reservoir and brake cylinder, of a pressure chamber, and means actuated by pressure in said chamber for supplying pressure fluid directly to the brake cylinder, said means also controlling the supply of pressure fluid to and the exhaustion of pressure fluid from said pressure chamber.

2. In a fluid pressure brake, the combination with a train pipe, auxiliary reservoir and brake cylinder, of a pressure maintenance valve comprising a movable abutment open on one side to brake cylinder pressure, and valve mechanism actuated by said movable abutment and arranged to control the supply of pressure fluid to and the exhaustion of pressure fluid from the opposite side of said movable abutment and to also supply pressure fluid directly to the brake cylinder.

3. In a fluid pressure brake, the combination with a train pipe, auxiliary reservoir and brake cylinder, of a pressure maintenance valve comprising a movable abutment open on one side to brake cylinder pressure, and valve mechanism actuated by said movable abutment and arranged upon admission of brake cylinder pressure to one side of said movable abutment to supply pressure fluid to the opposite side of said movable abutment, on equalization of pressure on the two sides of said movable abutment to cut off said supply upon reduction of brake cylinder pressure on said movable abutment to open a connection from a source of fluid pressure to the brake cylinder, and upon exhaustion of brake cylinder pressure to exhaust the pressure from the opposite side of said movable abutment.

4. In a fluid pressure brake, the combination with a train pipe, auxiliary reservoir, brake cylinder and a supplementary reservoir, of a pressure maintenance valve comprising a movable abutment open on one side to brake cylinder pressure, and valve mechanism actuated by said movable abutment and arranged upon admission of brake cylinder pressure to one side of said movable abutment to supply pressure fluid to the opposite side of said movable abutment, on equalization of pressure on the two sides of said movable abutment to cut off said supply, and upon reduction of brake cylinder pressure on said movable abutment to open a connection from the supplementary reservoir to the brake cylinder.

5. In a fluid pressure brake, the combination with a train pipe, auxiliary reservoir and brake cylinder, of a pressure maintenance valve comprising a movable abutment open on one side to brake cylinder pressure, and valve mechanism actuated by said movable abutment and arranged upon admission of brake cylinder pressure to one side of said movable abutment to supply pressure fluid to the opposite side of said movable abutment, on equalization of pressure on the two sides of said movable abutment to cut off said supply, upon reduction of brake cylinder pressure on said movable abutment to open a connection from a source of pressure fluid to the brake cylinder, and upon exhaustion of brake cylinder pressure on the brake cylinder side of said movable abutment to exhaust the pressure from the opposite side of said movable abutment and blank the connection from the source of pressure fluid to the brake cylinder.

6. In a fluid pressure brake, the combination with a train pipe, auxiliary reservoir, brake cylinder and a supplementary reservoir, of a pressure maintenance valve comprising a movable abutment open on one side to brake cylinder pressure, and valve mechanism actuated by said movable abutment and arranged upon admission of brake cylinder pressure to one side of said movable abutment to supply pressure fluid to the opposite side of said movable abutment, on equalization of pressure on the two sides of said movable abutment to cut off said supply, upon reduction of brake cylinder pressure on said movable abutment to open a connection from the supplementary reservoir to the brake cylinder, and upon exhaustion of brake cylinder pressure on the brake cylinder side of said movable abutment to exhaust the pressure from the opposite side of said movable abutment and blank the connection from the supplementary reservoir to the brake cylinder.

7. In a fluid pressure brake, the combination of a train pipe, auxiliary reservoir and brake cylinder, of a pressure maintenance valve comprising a movable abutment open on one side to the brake cylinder, and a valve actuated by said movable abutment and arranged upon admission of brake cylinder pressure to said movable abutment to supply fluid pressure to the opposite side of said movable abutment and upon exhaustion of brake cylinder pressure from said movable abutment to exhaust fluid pressure from the opposite side of said movable abutment.

8. In a fluid pressure brake, the combination of a train pipe, auxiliary reservoir and brake cylinder, of a pressure maintenance valve comprising a movable abutment open on one side to the brake cylinder, and a valve actuated by said movable abutment and arranged when the movable abutment is actuated by brake cylinder pressure to supply fluid pressure to the opposite side of said movable abutment and to cut off such supply when the pressures on the two sides of said movable abutment equalize, upon reduction of brake cylinder pressure on said movable abutment to open a connection from a source of pressure fluid to the brake cylinder and upon exhaustion of brake cylinder pressure to exhaust the pressure from the opposite side of said movable abutment.

9. In a fluid pressure brake, the combination with a train pipe, auxiliary reservoir, brake cylinder, and a supplementary reservoir, of a pressure maintenance valve comprising a movable abutment open on one side to the brake cylinder, and a valve actuated by said movable abutment and arranged when the movable abutment is actuated by brake cylinder pressure to supply fluid pressure to the opposite side of said movable abutment and to cut off such supply when the pressures on the two sides of said movable abutment equalize, and upon reduction of brake cylinder pressure on said movable abutment to open a connection from the supplementary reservoir to the brake cylinder.

10. In a fluid pressure brake, the combination with a train pipe, auxiliary reservoir and brake cylinder, of a pressure maintenance valve comprising a movable abutment open on one side to the brake cylinder, and a valve actuated by said movable abutment and arranged when the movable abutment is actuated by brake cylinder pressure to supply fluid pressure to the opposite side of said movable abutment and to cut off such supply when the pressures on the two sides of said movable abutment equalize, upon reduction of brake cylinder pressure on said movable abutment to open a connection from a source of pressure fluid to the brake cylinder, and upon exhaustion of pressure on the brake cylinder side of said movable abutment to exhaust the pressure from the opposite side of said movable abutment and blank communication from the source of fluid pressure to the brake cylinder.

11. In a fluid pressure brake, the combination with a train pipe, auxiliary reservoir, brake cylinder and a supplementary reservoir, of a pressure maintenance valve comprising a movable abutment open on one side to the brake cylinder, and a valve actuated by said movable abutment and arranged when the movable abutment is actuated by brake cylinder pressure to supply fluid pressure to the opposite side of said movable abutment and to cut off such supply when the pressures on the two sides of said movable abutment equalize, upon reduction of brake cylinder pressure on said movable abutment to open a connection from the supplementary reservoir to the brake cylinder, and upon exhaustion of pressure on the brake cylinder side of said movable abutment to exhaust the pressure from the opposite side of said movable abutment and blank the connection from the supplementary reservoir to the brake cylinder.

12. In a fluid pressure brake, the combination with a train pipe, auxiliary reservoir and brake cylinder, of a pressure maintenance valve comprising a movable abutment open on one side to the brake cylinder, a valve actuated by said movable abutment, and a seat for said valve, said valve and seat being provided with ports and cavities so arranged that actuation of said movable abutment by brake cylinder pressure opens communication from a source of pressure fluid to the opposite side of the said movable abutment, upon equalization of pressures on opposite sides of said abutment said supply is cut off, and upon exhaustion of brake cylinder pressure the pressure fluid on the opposite side of said movable abutment is exhausted.

13. In a fluid pressure brake, the combination with a train pipe, auxiliary reservoir and brake cylinder, of a pressure maintenance valve comprising a movable abutment open on one side to the brake cylinder, a valve actuated by said movable abutment, and a seat for said valve, said valve and seat being provided with ports and cavities so arranged that when said movable abutment is actuated by brake cylinder pressure communication from a source of pressure fluid to the opposite side of said movable abutment is opened, upon equalization of pressures on opposite sides of said abutment said communication is cut off, upon reduction of pressure on the brake cylinder side of said movable abutment communication is established between a source of pressure fluid and the brake cylinder, and upon exhaustion of pressure on the brake cylinder side of said movable abutment the pressure fluid on the opposite side of said movable abutment is exhausted.

14. In a fluid pressure brake, the combination with a train pipe, auxiliary reservoir, brake cylinder and a supplementary reservoir, of a pressure maintenance valve comprising a movable abutment open on one side to the brake cylinder, a valve actuated by said movable abutment, and a seat for said valve, said valve and seat being provided with ports and cavities so arranged that when said movable abutment is actuated by brake cylinder pressure communication from a source of pressure fluid to the opposite side of said movable abutment is opened, upon equalization of pressures on opposite sides of said abutment said communication is cut off, and upon reduction of pressure on the brake cylinder side of said movable abutment communication is established between the supplementary reservoir and the brake cylinder.

15. In a fluid pressure brake, the combination with a train pipe, auxiliary reservoir and brake cylinder, of a pressure maintenance valve comprising a movable abutment open on one side to the brake cylinder, a valve actuated by said movable abutment, and a seat for said valve, said valve and seat being provided with ports and cavities so arranged that when said movable abutment is actuated by brake cylinder pressure communication from a source of pressure fluid to the opposite side of said movable abutment is opened, upon equalization of pressures on opposite sides of said abutment said communication is cut off, upon reduction of pressure on the brake cylinder side of said movable abutment communication is established between a source of pressure fluid and the brake cylinder, and upon exhaustion of fluid pressure from the brake cylinder side of said movable abutment the pressure is exhausted from the opposite side of said movable abutment and the communication from the source of fluid pressure to the brake cylinder is blanked.

16. In a fluid pressure brake, the combination with a train pipe, auxiliary reservoir, brake cylinder and a supplementary reservoir, of a pressure maintenance valve comprising a movable abutment open on one side to the brake cylinder, a valve actuated by said movable abutment, and a seat for said valve, said valve and seat being provided with ports and cavities so arranged that when said movable abutment is actuated by brake cylinder pressure communication from a source of pressure fluid to the opposite side of said movable abutment is opened, upon equalization of pressures on opposite sides of said abutment said communication is cut off, upon reduction of pressure on the brake cylinder side of said movable abutment communication is established between the supplementary reservoir and the brake cylinder, and upon exhaustion of fluid pressure from the brake cylinder side of said movable abutment the pressure is exhausted from the opposite side of said movable abutment and the communication from the supplementary reservoir to the brake cylinder is blanked.

17. In a fluid pressure brake, the combination with a train pipe, auxiliary reservoir, brake cylinder and triple valve, of a pressure maintenance valve comprising a movable abutment open on one side to the brake cylinder, and a valve actuated thereby, a source of fluid pressure connected to said maintenance valve, said triple valve being arranged in service position to open communication between the auxiliary reservoir and the brake cylinder, and the valve actuated by said movable abutment being arranged upon admission of brake cylinder pressure to one side of said movable abutment to connect said source of fluid pressure to the opposite side of said movable abutment and upon diminution of pressure on the brake cylinder side of said movable abutment to connect said source of fluid pressure to the brake cylinder.

18. In a fluid pressure brake, the combination with a train pipe, auxiliary reservoir, a supplementary reservoir, brake cylinder and triple valve, of a pressure maintenance valve comprising a movable abutment open on one side to the brake cylinder, and a valve actuated thereby, connections from the supplementary reservoir to the pressure maintenance valve, said triple valve being arranged in service position to open communication between the auxiliary reservoir and the brake cylinder, and the valve actuated by said movable abutment being arranged upon admission of brake cylinder pressure to one side of said movable abutment to connect the supplementary reservoir to the opposite side of said movable abutment and upon diminution of pressure on the brake cylinder side of said movable abutment to connect the supplementary reservoir to the brake cylinder.

19. In a fluid pressure brake, the combination of a triple valve, auxiliary reservoir, two brake cylinders, independent connections between said brake cylinders and the triple valve, and a check valve controlled connection between said brake cylinders.

20. In a fluid pressure brake, the combination of a triple valve, auxiliary reservoir and two brake cylinders, independent connections between said brake cylinders and the triple valve, a pressure maintenance valve connected to one of said cylinders and arranged to maintain the same against leakage, a connection between the two brake cylinders, and a check valve in said connection seating toward the brake cylinder to which the pressure maintenance valve is connected.

21. In a fluid pressure brake, the combination of a valve device having connections to the train pipe, brake cylinder, auxiliary reservoir and atmosphere and operating by variations in train pipe pressure, a pressure chamber, means arranged to admit air thereto equal to the desired brake cylinder pressure, and a valve device actuated by the pressure in said chamber and arranged upon diminution of brake cylinder pressure to admit fluid pressure to said brake cylinder and upon exhaustion of the brake cylinder pressure to connect said pressure chamber to the atmosphere.

22. In a fluid pressure brake, the combination of a valve device having connections to the train pipe, brake cylinder and auxiliary reservoir and operating by variations in train pipe pressure, and a supplementary valve device comprising a movable abutment open on one side to the brake cylinder, a single valve actuated by said movable abutment, connections whereby when the primary valve device connects the auxiliary reservoir to the brake cylinder said supplementary valve device is actuated to admit fluid pressure to the opposite side of said movable abutment equal to the desired pressure in the brake cylinder, and to also control a connection between a supply of fluid pressure and the brake cylinder, and a spring arranged to act on said movable abutment in reinforcement of the pressure on that side of said movable abutment open to the brake cylinder.

In testimony whereof, I have hereunto set my hand.

JACOB RUSH SNYDER.

Witnesses:
WM. P. LARKIN,
MARY E. CAHOON.

Copies of this patent may be obtained for five cents each, by addressing the "Commissioner of Patents, Washington, D. C."